Figure 1:
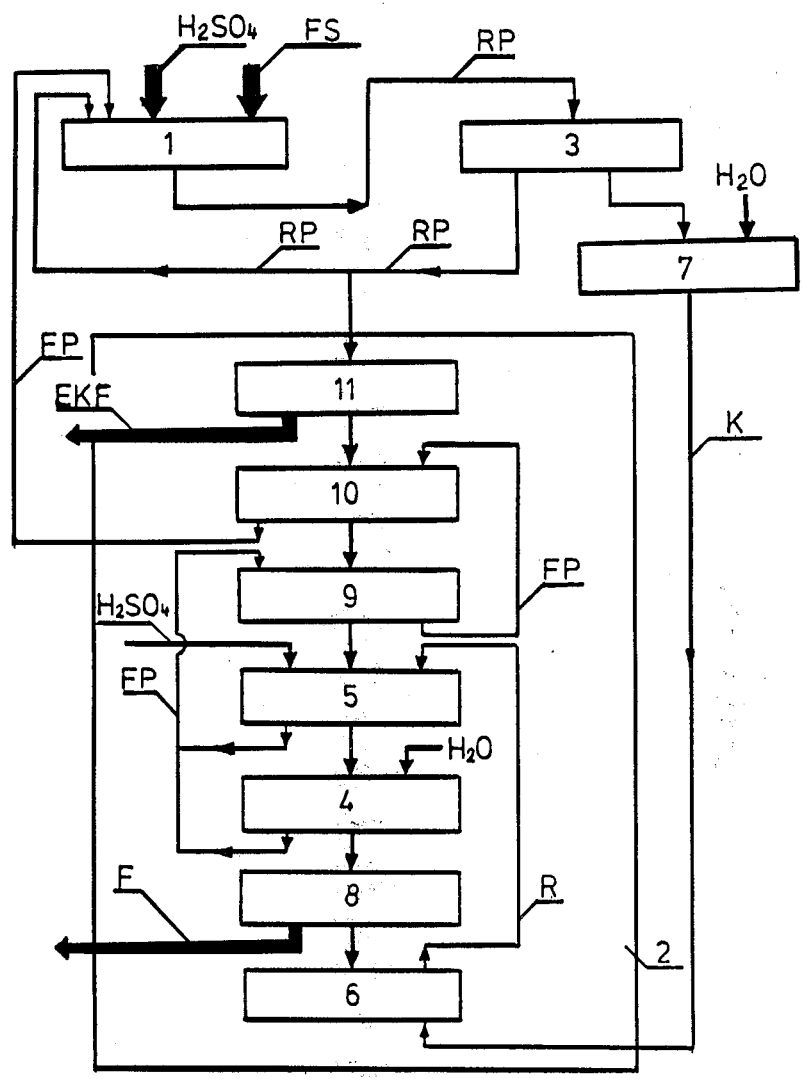

United States Patent [19]

Schroeder et al.

[11] 4,301,130

[45] Nov. 17, 1981

[54] METHOD OF WASHING WASTE PHOSPHOGYPSUM

[75] Inventors: Jeizy Schroeder, Wroclaw; Mieczyslaw Lewandowski; Antoni Kuzko, both of Szczecin; Henryk Gorecki, Wroclaw; Krzysztof Zielinski, Szczecin; Tadeusz Pozniak, Police; Stefan Zięba, Szczecin; Helena Górecka, Curie; Adam Pawelczyk, Wroclaw; Andizej Wysocki, Police, all of Poland

[73] Assignee: Politechnika Wroclawska, Wroclaw, Poland

[21] Appl. No.: 34,075

[22] Filed: Apr. 27, 1979

[30] Foreign Application Priority Data

May 6, 1978 [PL] Poland .................................. 206635

[51] Int. Cl.$^3$ .............................................. C01B 25/16
[52] U.S. Cl. .................................... 423/320; 423/166
[58] Field of Search ............... 423/320, 166, 167, 319, 423/555

[56] References Cited

U.S. PATENT DOCUMENTS 3,632,307  1/1972  Van Es et al. ...................... 423/320
3,745,208  7/1973  Bigot et al. ........................ 423/320

FOREIGN PATENT DOCUMENTS 6800867  7/1968  Netherlands ....................... 423/320

OTHER PUBLICATIONS

*Phosphoric Acid*, vol. I, Slack editor, 1968, Index, pp. 215-217, 254, 274, 283, 303, 309, 348, 351, 364.
Phosphoric Acid, Chapter 5, Separation of Calcium Sulfate, Moraillon et al., vol. I, 1968, pp. 443-501.

*Primary Examiner*—O. R. Vertiz
*Assistant Examiner*—Gregory A. Heller
*Attorney, Agent, or Firm*—Ladas & Parry

[57] ABSTRACT

A method according to this invention is used for washing waste phosphogypsum produced at decomposition of a mineral phosphoric raw material with sulphuric acid, wherein the said washing is carried on in countercurrent on a multi-zone filter; to the last zone of this filter there is supplied water while filter washings with highest concentration of the component being washed-off are returned to the decomposition stage. The essence of this method consists in that to the washing liquids there is introduced sulphuric acid solution of a concentration of sulphuric acid ranging within the limits from 20 up to 98 percent by weight of sulphuric acid in the amount of 1 to 30 percent of sulphuric acid amount used for decomposition of a phosphoric raw material. Sulphuric acid solution may be introduced either directly to the washing zones, or to the filter washings, or it may be used, first, for washing the filter cloths and next directed to the washing zones, or first introduced to a condensate produced at the time of cooling down the reaction pulp and then used for washing the filter cloth and, finally, introduced to the remaining washing zones.

5 Claims, 4 Drawing Figures

METHOD OF WASHING WASTE PHOSPHOGYPSUM

This invention relates to a method of washing waste phosphogypsum produced by decomposition of a mineral phosphorous raw material by acting with sulphuric acid to manufacture of phosphoric acid for the fertilizer industry.

In the course of production of wet phosphoric acid—particularly in the case of the application of the dihydrate method—phosphoric acid solution and crystalline sediment of calcium sulfate together with mineral pollutants are produced. The amount of this waste exceeds considerably the mass of the product, because the amount of the waste phosphogypsum being produced in the acid ranges from 4.5 to 5.5 tons per ton of $P_2O_5$ in terms of dry matter. This sediment in a fine-crystalline form is separated by means of filtration from the phosphoric acid solution, whereas the major part of the pure component $P_2O_5$ is obtained from this sediment by means of a countercurrent washing with water. The filter washings obtained as a result of washing are returned to the decomposition process, whereas the phosphogypsum sediment being washed is directed either to the waste dump or to the utilization processes.

The methods of washing the waste phosphogypsum obtained by means of the wet method known e.g. from the collective work entitled "Phosphoric acid", chapter 5, Separation of calcium sulfate, vol. 1, pages 443–501, editor—M. Dekker, New York, 1968, consist in a multi-stage countercurrent washing of phosphogypsum with water, the amount of this water being limited by the water balance of the method. The amount of water for washing phosphogypsum introduced onto the filter is equivalent to the amount of water taken from the system in the form of a solution of phosphoric acid, the concentration of this acid ranging from 27 up to 40 percent of $P_2O_5$, in the form of crystal water combined with calcium sulfate as $CaSO_4.2H_2O$, in the form of water physically combined with phosphogypsum, the moisture content of the said phosphogypsum being within the limits from 15 up to 40 percent by weight of $H_2O$, as well as in the form of a condensate produced in an adiabatic evaporator. In case of sulphuric acid used for decomposition of the phosphoric raw material, the amount of water supplied to the filter must be decreased by the mass of water being used for the dilution of this acid. For filtering and washing phosphogypsum various types of filters are used, the most widely used in the world industry being the continuous rotary horizontal type filters with swivel cells, as well as belt filters. Irrespective of the filter type being used, the reaction pulp being a crystalline suspension of phosphogypsum in a phosphoric acid solution is supplied onto the filter, where a sedimentation of filter cake and then filtration of this suspension take place. The design of the filter ensures a uniform shifting of sediment under the successive installations arranged in a due order for batching the washing liquids onto the sediment. Washing is effected in countercurrent and consists in an introduction of a liquid of ever lower concentration of $P_2O_5$ to each subsequent pouring vessel. Upon the last washing with clean water there takes place suction of water from the filter cake and then removal of the filter cake from the filter cloth, which is next washed with warm water. The consumption index of phosphoric raw material is dependent, first of all, on the losses of $P_2O_5$ contained in the form of waste phosphogypsum. In case of mass production, even a small content of $P_2O_5$ in the phosphogypsum sediment causes in effect considerable losses of this constituent. Losses of $P_2O_5$ are caused by an incomplete washing of phosphogypsum sediment, adsorption of phosphate ion on the surface of phosphogypsum crystals and in capillaries formed in the structure of a filter bed, as well as adsorption of phosphate compounds such as $CaHPO_4.2H_2O$, $Ca(H_2PO_4)_2.H_2O$, $AlPO_4$ and $FePO_4$ on the crystal faces. Phosphorus ions are also built into the crystal lattice of calcium sulfate and, in a layered way, in the form of compounds $CaHPO_4.2H_2O$ and $Ca(H_2PO_4)_2.H_2O$. Also are observed losses of $P_2O_5$ caused by an occlusion of solutions containing $P_2O_5$ in crystalline aggregate bonds. A considerable percentage of losses of $P_2O_5$ is caused by an incomplete decomposition of phosphoric raw materials this being due to a low degree of grinding (disintegration) of raw materials and coating the raw material grains with calcium sulfate. The magnitude of the individual forms of losses is dependent upon the conditions of the process of decomposition of a phosphoric raw material, crystallization of phosphogypsum, as well as upon the phosphogypsum sediment washing effectiveness. This washing effectiveness is, in turn, dependent upon the form of phosphogypsum crystals, their size and granulation and, to a lesser extent, upon the washing conditions and the technical condition of the filter being used.

This invention relates to a method of washing the waste phosphogypsum produced during decomposition of a mineral phosphoric raw material with sulphuric acid, wherein the said washing is effected in a countercurrent on a multi-zone filter; to the last zone there is introduced water and the filter washings with the highest concentration of the $P_2O_5$ constituent being washed off are returned to the washing stage. The essence of this invention consists therein that a solution of sulphuric acid with concentration ranging from 20 percent by weight to 98 percent by weight of sulphuric acid is introduced to the washing liquids, the amount of the said sulphuric acid solution being equal to 1 to 30 percent of the sulphuric acid standard as used for decomposition of phosphorous raw material. The solution of sulphuric acid is introduced to the system either directly to the washing zones, or to the filter washings. Another possible realization consists in washing the filter cloths with the solution of sulphuric acid at the moment when the phosphogypsum sediment has been removed from them and then supplying this solution in countercurrent to the remaining washing zones. The above mentioned solution may also be introduced to condensate obtained at the time of an adiabatic cooling of reaction pulp and then supplied onto the cloths and, in a countercurrent, to the remaining washing zones. The sulphuric acid supplied onto the filter may be shunted from the basic stream of sulphuric acid being used for decomposition of phosphoric raw material, with maintaining simultaneously a constant load of total acid stream. It is also possible to use sulphuric acid of a concentration from 20 to 70 percent of $H_2SO_4$ by weight, being the waste of some other processes to this solution, the acid concentration being dependent upon the concentrating systems used in these processes.

In the method of this invention, introduction of sulphuric acid of an appropriately chosen concentration, and in a given proportion, to the filtering system yields in effect an additional volume of a washing liquid which does not contain $P_2O_5$. The amount of acid must be appropriately limited, because an introduction of a greater amount of sulphuric acid can lead to losses of acid, increased moisture content of the filter cake and an increased corrosive action in the filtering and washing unit. Choosing a proper amount of acid renders it possible to increase the content of $P_2O_5$ being washed-off. Particularly advantageous is introduction of sulphuric acid obtained from a production solution from a decomposition process containing an increased amount of $P_2O_5$ as compared with the conventional methods with the content of $P_2O_5$ ranging within the limits from 32 to 40 percent, because under such conditions the amount of water being supplied for washing purpose is considerably lower. Introduction of sulphuric acid to the washing liquids also causes a desorption of phosphorus compounds being adsorbed on the surface of phosphogypsum crystals and in the capillary spaces of the sediment. Introduction of a concentrated sulphuric acid to the washing liquids also causes an increased temperature of these liquids this being due to a high dilution heat. An increased temperature of the washing liquids also leads to an improved washing effectiveness. The solution of sulphuric acid passing in countercurrent through the filter, as well as that used for washing the filter cloths leads to a continuous dissolution of the sediments which are deposited on the filter cloth, thus improving the efficiency and prolonging the service life of these cloths. When using sulphuric acid solutions which are wastes of some other processes for decomposition of a phosphoric raw material, the use of the washing process according to this invention offers considerable advantages. The waste sulphuric acid has, as a rule, considerably lower concentration than that of a contact sulphuric acid. Introduction of a diluted sulphuric acid directly to the decomposition reactor causes in effect a reduction in the amount of water supplied to the filter by the amount of water contained in the solution of the waste sulphuric acid. Moreover, introduction of the waste sulphuric acid to the washing liquids in countercurrent allows for an adsorption of a number of pollutants contained in the waste acid, such as organic compounds, ferric compounds, aluminium compounds etc. on the phosphogypsum sediment.

Figure 2:
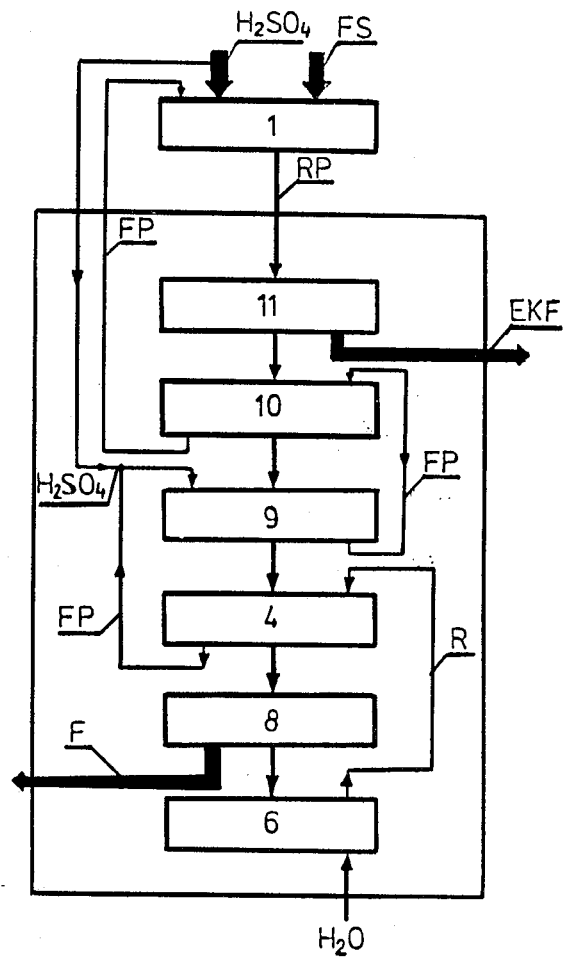
Figure 3:
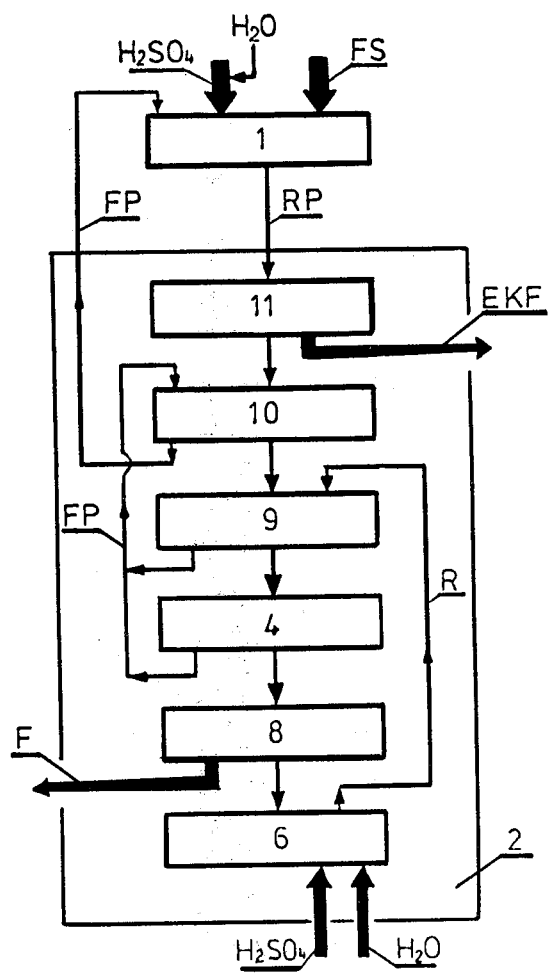
Figure 4:
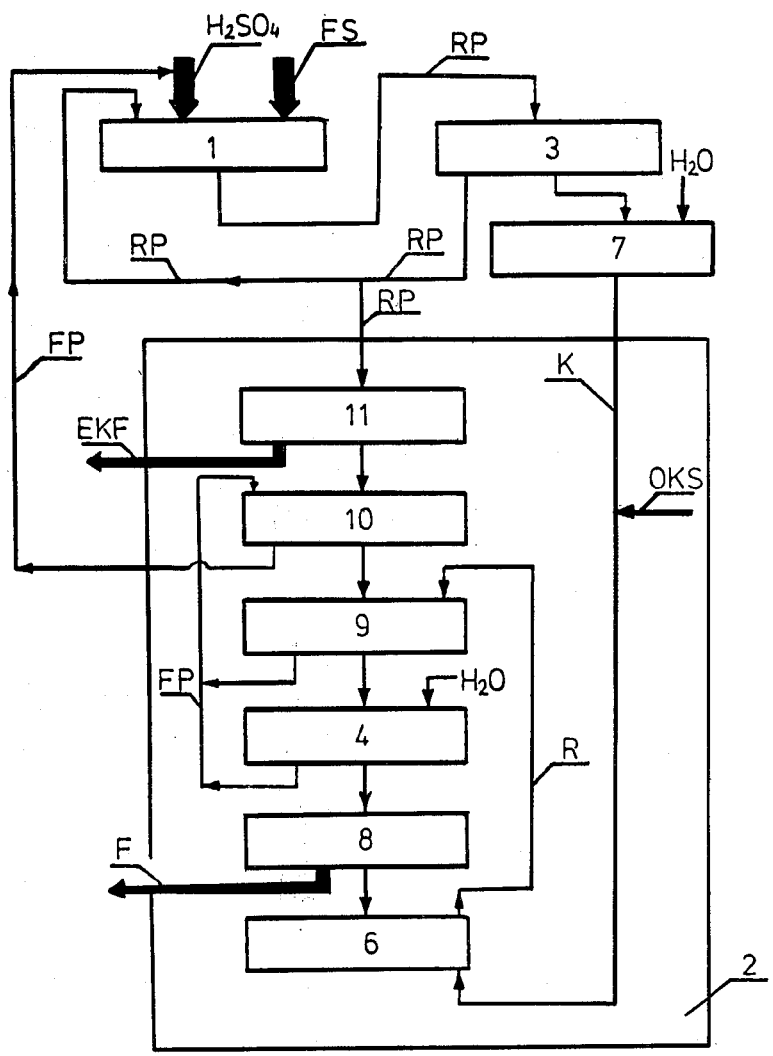

The subject of this invention has been presented by way of the four figures in the accompanying drawing, wherein FIGS. 1 to 4 present the respective flow-sheets of the exemplary methods Examples 1 to 4.

EXAMPLE I 48 tons of phosphoric raw material FS per hour are introduced to a reaction system 1 in the wet phosphoric acid plant the said phosphoric acid containing 33.5 percent of $P_2O_5$; for decomposition there were used 20.2 cu. m. per hour of sulphuric acid of $H_2SO_4$ concentration equal to 98 percent, the said sulphuric acid being diluted in parallel flow with filter washings FP supplied from a rotary vacuum filter 2 in the amount of 138 cu. m. per hour. Decomposition of phosphoric raw material FS is effected at a temperature of 78 degrees Centigrade, the reaction pulp RP being cooled down by means of an adiabatic evaporator 3. In the system there has been applied forced circulation of pulp RP through the evaporator 3. Ratio of pulp returned to the reaction system 1 to the pulp supplied to the filter 2 is 8:1. Washing is effected in countercurrent by supplying clean water to the last washing zone 4 in the amount of 15 cu. m. per hour. To the washing zone 5 preceding the last one there is supplied solution R obtained from the filter cloth washing zone 6 with condensate K supplied from a scrubber 7 of an adiabatic evaporator 3 in the amount of 50 cu. m. per hour, containing 0.8 percent by weight of $P_2O_5$; sulphuric acid of $H_2SO_4$ concentration equal to 98 percent by weight in the amount of 2 cu. m. per hour is introduced to the apparatus for pouring the solution R on the filter cake, in the zone 5 preceding the last one. Filter washings from the last zone 4 and last but one zone 5 preceding the discharging zone 8 where phosphogypsum F is discharged on band conveyors for transport of this waste to a store, containing 5.4 percent by weight of $H_2SO_4$ and 6.0 percent by weight of $P_2O_5$ are supplied to the second washing zone 9. Filter washings FP obtained in the second washing zone are supplied to pouring vessel situated above the first washing zone 10. Filter washings FP obtained in this second zone 9 containing 22.6 percent by weight of $P_2O_5$ and 2.2 percent by weight of $H_2SO_4$ are used for the dilution of the sulphuric acid supplied to the reaction system 1. In the course of this process, in the filtration zone 11 there is obtained wet phosphoric acid EKF of 29.4 percent concentration by weight of $P_2O_5$ in the amount of 30.5 cu. m. per hour and waste phosphogypsum F of moisture content equal to 26.0 percent by weight of $H_2O$ in the amount of 103 tons per hour, the said waste phosphogypsum containing 0.25 percent by weight of $P_2O_5$ in a form soluble in water in terms of dry matter, 0.25 percent by weight of $P_2O_5$ in substitutive form, as well as 0.28 percent by weight of $P_2O_5$ in the form of a non-decomposed phosphoric raw material FS.

EXAMPLE II

Method of washing waste phosphogypsum presented in the second example of embodiment differs from the method described in Example I in that it has only three washing zones, the first zone 10, the second zone 9 and the last zone 4, the other differences being that in the filter cloth washing zone 6 there is used clean water and that in the reactive system 1 for cooling down the reaction pulp RP there has been used a forced ventilation system. Washing is carried on in countercurrent whereas to the last washing zone 4 there is supplied solution R obtained from the filter cloth washing zone 6 in the amount of 65 cu. m. per hour having a temperature of 60 degrees Centigrade. To the filter washings FP obtained in the last washing zone 4 there is introduced sulphuric acid of a concentration of $H_2SO_4$ equal to 98 percent by weight in the amount of 2 cu. m. per hour, the said acid being shunted from the acid stream being supplied to the reactive system 1. The obtained filter washings FP containing 7.9 percent by weight of $H_2SO_4$ and 5.5 percent by weight of $P_2O_5$ are used for washing filter cake in the second washing zone 9 and the solution obtained in this zone of 4.8 percent concentration of $H_2O$ by weight and 12.6 percent concentration of $P_2O_5$ by weight is used for washing the filter cake in the first washing zone 10 situated immediately behind the filtration zone 11, the washings FP being next returned to the reactive system 1. In the course of this process there is produced wet phosphoric acid EKF of a concentration of $P_2O_5$ equal to 32 percent in the amount of 27.2 cu. m. per hour and waste phosphogypsum F of moisture content equal to 28.1 percent of $H_2O$ by weight in the amount of 108 tons per hour. This sediment contains 0.28 percent by weight of $P_2O_5$ in a form soluble in water in terms of dry matter, 0.28 percent of $P_2O_5$ in a substitutive form, as well as 0.32 percent by weight of $P_2O_5$ in the form of a non-decomposed phosphoric raw material FS.

EXAMPLE III

Method presented in this example is effected in an identical system as the method described in the second example the only differences being that to the filter cloth washing zone 6 there are supplied in parallel current water of a temperature of 65 degrees Centrigrade in the amount of 40 cu. m. per hour, together with sulphuric acid of a concentration of $H_2SO_4$ equal to 65 percent by weight in the amount of 8 cu. m. per hour. The solution R obtained in this zone containing 0.1 percent by weight of $P_2O_5$ and 15.4 percent by weight of $H_2SO_4$ is next used for washing the filter cake in the second washing zone 9, whereas to the last washing zone 4 clean water is supplied in the amount of 10 cu. m. per hour. Washings FP from the zones 4 and 9 are supplied to the first washing zone 10 whereas the obtained washing solution FP containing 24 percent by weight of $P_2O_5$ and 4.9 percent by weight of $H_2SO_4$ in the amount of 134 cu. m. per hour is introduced directly to the reactive system 1. Dillution of the sulphuric acid of 98 percent concentration of $H_2SO_4$ by weight in the amount of 17.3 cu. m. per hour supplied to the reactive system is obtained by adding water in the amount of 12 cu. m. per hour. In the filtration zone 11 there is obtained a wet phosphoric acid EKF of a concentration of $P_2O_5$ equal to 20.0 percent by weight in the amount of 29.4 cu. m. per hour. In the course of this process there is obtained, upon washing, phosphogypsum F of moisture content equal to 26 percent of $H_2O$ by weight in the amount of 103 tons per hour, containing 0.42 percent of $P_2O_5$ in a form non-soluble in water in terms of dry matter of this 0.28 percent of $P_2O_5$ by weight in a substitutive form, as well as 0.37 percent of $P_2O_5$ by weight in the form of a non-decomposed phosphoric raw material.

EXAMPLE IV

Method presented in this example is effected in an identical system as that described in the first example the only difference being that it has only three washing zones, the sulphuric acid for the filter liquors being introduced to the stream of a condensate K behind the scrubber 7. Washing in the first zone 10 is effected with filter washings FP obtained from the second washing zone 9 and the last washing zone 4, whereas to the second washing zone 9 there is supplied solution R obtained in the filter cloth washing zone 6. Condensate K in the amount of 42 cu. m. per hour is used for washing cloths within zone 6 to which after hydrolysis waste sulphuric acid OKS of 1.56 t per cu. m. density is introduced containing 0.8 percent by weight of $Fe_2O_3$ in the amount of 4 cu. m. per hour from a titanium oxide manufacturing plant. To the last washing zone 4 there is supplied water in the amount of 20 cu. m. per hour. Filter washings FP from zones 4 and 9 contain 5.6 percent by weight of $H_2SO_4$ and 10.9 percent by weight of $P_2O_5$. For decomposition of phosphoric raw material FS at a rate of 48 t per hour there is used sulphuric acid of a concentration of $H_2SO_4$ equal to 98 percent by weight in the amount of 20 cu. m. per hour, dilluted with washings FP from the first washing zone 10 in the amount of 146 cu. m. per hour of a concentration of $P_2O_5$ equal to 22.3 percent by weight and concentration of $H_2SO_4$ equal to 2.3 percent by weight. In the course of this process there is obtained wet phosphoric acid EKF of a concentration of $P_2O_5$ equal to 29.0 percent by weight in the amount of 30.4 cu. m. per hour and waste phosphogypsum F of moisture content equal to 23 percent by weight of $H_2O$ in the amount of 99 t per hour containing 0.22 percent by weight of $P_2O_5$ in a form soluble in water; 0.28 percent of $P_2O_5$ by weight in a substitutive form and 0.3 percent by weight of $P_2O_5$ in the form of a non-decomposed phosphoric raw material in terms of dry matter.

LEGEND

1—reactive system
2—continuous rotary horizontal type filter
3—adiabatic evaporator
4—last washing zone
5—one but last washing zone
6—bloth washing zone
7—scrubber
8—phosphogypsum discharging zone
9—second washing zone
10—first washing zone
11—filtration zone
FS—phosphoric raw material
FP—filter washings
RP—reaction pulp
R—solution
K—condensate
F—phosphogypsum
SKF—wet phosphoric acid
OKS—waste sulphuric acid.

We claim:
1. A method of washing waste phosphogypsum, in which the calcium sulphate present is in the dihydrate form, obtained on decomposition of mineral phosphoric raw material with sulphuric acid, which comprises carrying said washing out in countercurrent on a multi-zone filter with introduction to the washing liquids in the last zone of water and a sulphuric acid solution of a concentration of sulphuric acid ranging from 20% by weight up to 98% by weight in the amount of 1 to 30% of the sulphuric acid amount used for decomposition of said phosphoric raw material, returning those filter washings having a maximum concentration of the component being washed to the decomposition stage and removing washed waste phosphogypsum, in which the calcium sulphate present is in the dihydrate form, and aqueous phosphoric acid from the washing system.

2. A method as claimed in claim 1, wherein the sulphuric acid solution is introduced directly to the washing zones.

3. A method as claimed in claim 1, wherein the sulphuric acid solution is introduced to the filter washings.

4. A method as claimed in claim 1, wherein the sulphuric acid solution is first used for washing the filter cloth after removal of phosphogypsum sediments, and then this solution is directed in countercurrent to the remaining washing zones.

5. A method as claimed in claim 1, wherein the sulphuric acid solution is introduced to condensate produced at the time of an adiabatic cooling of the reaction pulp, said solution being used for washing the filter cloths upon removal of phosphogypsum sediments therefrom and then the obtained solution is directed in countercurrent to the remaining washing zones.

* * * * *

UNITED STATES PATENT AND TRADEMARK OFFICE
CERTIFICATE OF CORRECTION

PATENT NO. : 4,301,130
DATED : November 17, 1981
INVENTOR(S) : Jerzy Schroeder et al.

It is certified that error appears in the above—identified patent and that said Letters Patent is hereby corrected as shown below:

On the title page, item [75], "Jeizy Schroeder" should read --- Jerzy Schroeder ---.

Signed and Sealed this

Fifteenth Day of June 1982

[SEAL]

Attest:

GERALD J. MOSSINGHOFF

Attesting Officer           Commissioner of Patents and Trademarks